Nov. 18, 1969   E. STOKER   3,478,377

THREADING MACHINE

Filed June 8, 1967

INVENTOR.
EUGENE STOKER

By *T. H. Symmons*

Attorney

United States Patent Office 3,478,377
Patented Nov. 18, 1969

3,478,377
THREADING MACHINE
Eugene Stoker, Pittsburgh, Pa., assignor to Anvil Products, Inc., Allison Park, Pa., a corporation of Pennsylvania
Filed June 8, 1967, Ser. No. 644,512
Int. Cl. B23q *11/00;* B23g *11/00*
U.S. Cl. 10—102                                      2 Claims

ABSTRACT OF THE DISCLOSURE

This patent discloses a nipple-threading machine provided with a screw-type conveyor for removing from beneath the machine the chips or shavings that are formed in the thread-chasing operation, the removal being done continuously without stopping the machine and the conveyor not becoming fouled in the event that a nipple drops among the shavings or chips to be removed.

BACKGROUND OF THE INVENTION

Field of the invention

This invention relates to thread-chasing machines, and in particular, to machines for chasing threads on nipples.

Description of the prior art

Automatic machinery for chasing threads on nipples is known. In one known kind of machine, means are provided for grasping a short length of pipe constituting the blank from which a nipple is formed, placing it upon a receiving means such as a V-shaped trough, moving it away from the die against a stop, grasping it and moving it forward a predetermined distance into contact with a power driven rotating die, and then discharging from the machine the nipple blank so threaded. In this operation, a considerable quantity of chips or shavings are formed. The prior practice has been to permit these, along with the oil sprayed onto the work to lubricate the threading operation, to accumulate in a pan or bin located beneath the machine. Then, about twice in an eight-hour shift, it was necessary to stop the machine to clean out the pan or bin. This has lowered the productivity of the machine substantially, considering that the cleaning operation required 15 or 20 minutes to complete. With this mode of operation, moreover, it has been inconvenient to recover any nipples that fell into the bin or pan beneath the machine.

The concept of providing means for conveying away from a machine that generates a considerable quantity of chips or shavings on a continuous basis the chips or shavings so formed, so as to obviate the necessity for shutting down the machine, is an old one. Chip conveyors have hitherto been used with machines for the internal or external threading of pipe. So far as I am aware, however, no satisfactory such means has ever been provided for use with a nipple-threading machine. A nipple-threading machine presents the problem that, considering the large number of small objects being handled, it is almost inevitable that at resonably frequent intervals a nipple is dropped down among the chips or shavings, rather than being properly discharged from the machine. Such nipples tended to catch in or foul the chip-conveying mechanism. When an attempt was made to prevent such nipples from entering the chips, as by using a guard or deflector, it was found that the guard or deflector also prevented the chips from entering the conveying mechanism. In consequence, it has hitherto been the practice with nipple-threading machines to remove the chips by hand and to accept the attendant economic disadvantages.

SUMMARY OF THE INVENTION

This invention relates to machines for chasing threads on metal stock, and in particular, to machines for threading nipples. In accordance with the invention, such machines are provided with a continuously operating chip- or shaving-removal means comprising a screw-type conveyor resting in an inclined, open-topped trough, with the upper end of the screw conveyor not being anchored, journaled, or constrained otherwise than by gravity and the trough. This provides a nipple machine having chip removal means that operates continuously and resists fouling by nipples entering the chips or shavings.

BRIEF DESCRIPTION OF THE DRAWINGS

A complete understanding of the invention may be obtained from the foregoing and following description thereof, taken together with the accompanying drawings, in which.

DESCRIPTION OF THE PREFERRED EMBODIMENTS

Figure 1:
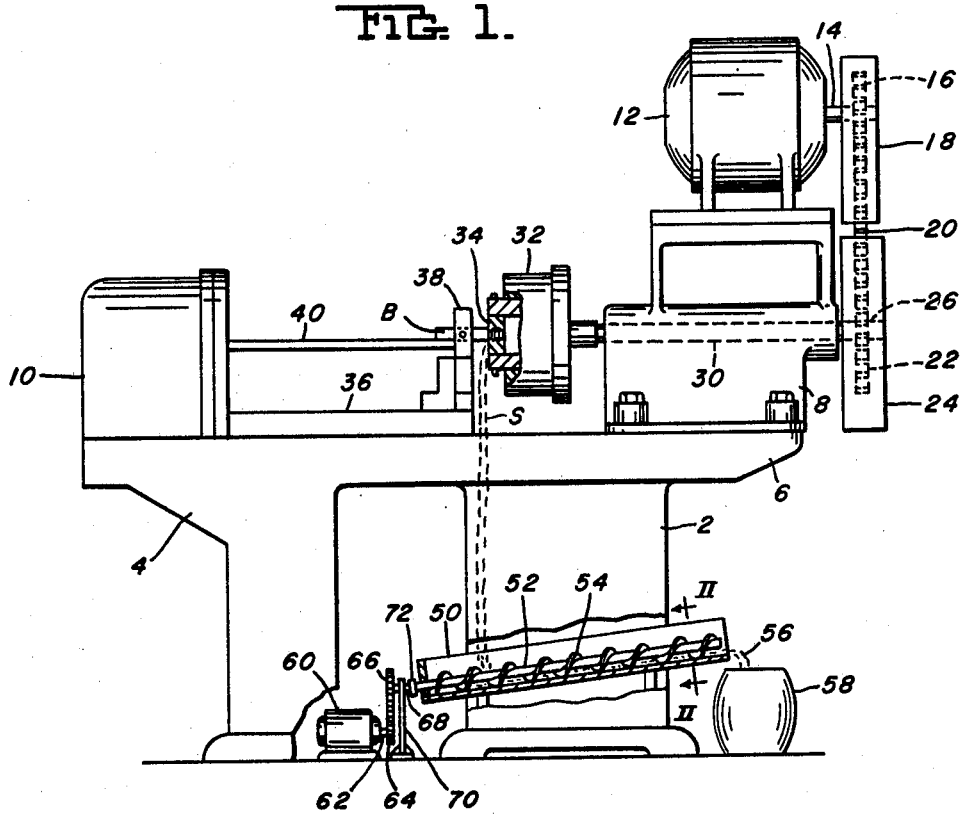
FIG. 1 is a front elevation view, partly schematic of a machine for threading nipples provided with chip-removal means in accordance with the present invention, the view being partly broken away to reveal interior details of the machine.
Figure 2:
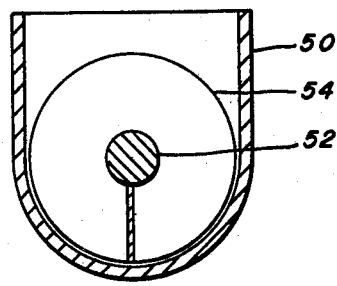
FIG. 2 is a cross-sectional view taken on the line II—II of FIG. 1.

As shown in FIG. 1, a nipple-threading machine comprises, in addition to other details not here relevant, a pair of support legs 2, 4 supportting a generally horizontal portion 6, upon which are mounted a head portion 8 and a tail portion 10. Mounted above the head portion 8 is a motor 12, powered by suitable means not shown, the motor 12 having a shaft 14 upon which there is mounted a sprocket 16 provided with a suitable guard 18. The sprocket 16 is connected by means of a chain 20 to a second sprocket 22, which is provided with a guard 24 and is mounted on a shaft 26 journaled within the head portion 8 as at 30 and connected at its other end with a head 32, within which there is mounted a die 34 for chasing threads on an exterior end of a nipple blank B. Mounted for reciprocal movement by means not shown on a way 36 is a clamp 38 that engages the nipple blank B, which may be supported by suitable means, such as a pair of rods 40. It is known, moreover, to provide nipple-threading machines with fast-acting means for placing nipple blanks on the rods 40, releasing them from the die 34 when a thread has been chased, and conveying the threaded blanks to a suitable discharge means, but in the interest of simplicity, showing of such equipment has been omitted.

The thread-chasing operation generates a considerable quantity of chips or shavings S, and it has been the practice prior to the instant invention to permit such chips or shavings S to fall into the interior of the machine, where they are received within a pan that is cleaned out from time-to-time, it being necessary to stop the machine for this purpose.

In accordance with the present invention, a nipple-threading machine is provided with a chip remover comprising an open-topped trough 50, within which there is set a shaft 52 provided with a large-pitch helical screw thread 54, such that by appropriate rotation of the shaft 52, shavings S are conveyed along the trough 50 and are discharged therefrom, as at 56 into a barrel 58 or other appropriate container. To that end, there is provided a motor 60, powered by suitable means not shown, and having a shaft 62, upon which there is mounted a pinion 64 engaging a pinion 66 of a shaft 68, journaled in a suitable support 70 and connected by means of a flexible coupling 72 with one end of the shaft 52. The opposite or upper end of the shaft 52 is not anchored, journaled or constrained otherwise than by gravity and the trough 50. The mounting of the shaft 52 is such that the upper end thereof is free to move in diverse arcs with the lower end of the shaft being the center of the arcs. Therefore, when a nipple drops down into the conveying mechanism, the upper end of shaft 52 is free to move in directions transverse to the longitudinal axis of the shaft 52 and accordingly, the shaft 52 can wobble and shake loose any such nipple that would catch in or foul the conveying mechanism. Thus, by operation of the motor 60, shavings S falling into the trough 50 are conveyed continuously to the barrel 58, without need for stopping the nipple-threading machine.

While I have shown and described herein a certain embodiment of my invention, I intend to cover as well any change or modification therein which may be made without departing from the spirit and scope of the invention.

I claim as my invention:

1. The combination with a nipple-threading machine of means for conveying therefrom continuously during the operation thereof chips or shavings formed during the thread-chasing operation, said means comprising, in combination, an open-topped trough having a first end and a second end, a shaft within said trough provided with conveyor screw threads, and means for rotating said shaft, said shaft having opposite ends with one end of said shaft being operatively connected to said means for rotating said shaft and the other end of said shaft being unconstrained and free to move in directions transverse to the longitudinal axis of said shaft, said first end of said trough being positioned under the thread-chasing die of said nipple-threading machine and said second end of said trough being positioned outboard of said machine.

2. Apparatus as defined in claim 1, further characterized in comprising means for receiving chips or shavings falling from said second end of said trough, said one end of said shaft being operatively connected to said means for rotating said shaft by means of a flexible coupling and the other end of said shaft being further free to move in diverse arcs with said one end of the shaft being the center of said arcs.

References Cited

UNITED STATES PATENTS

| | | | |
|---|---|---|---|
| 1,978,373 | 10/1934 | Romaine | 90—15 |
| 2,047,034 | 7/1936 | Roehm et al. | 90—74 |
| 2,220,425 | 11/1940 | Potter | 29—44 |
| 2,531,647 | 11/1950 | Roesen et al. | 90—15 |

CHARLES W. LANHAM, Primary Examiner

E. M. COMBS, Assistant Examiner

U.S. Cl. X.R.

10—162